United States Patent [19]
Barton, Jr.

[11] Patent Number: 5,172,872
[45] Date of Patent: Dec. 22, 1992

[54] SELF-LOCKING TAPE DRIVE HUB

[75] Inventor: William M. Barton, Jr., Encinitas, Calif.

[73] Assignee: Overland Data, Inc., San Diego, Calif.

[21] Appl. No.: 561,871

[22] Filed: Aug. 2, 1990

[51] Int. Cl.$^5$ .................. G11B 15/32; B65H 16/10
[52] U.S. Cl. ................................................. 242/201
[58] Field of Search ............... 242/200, 201, 202, 204, 242/68.3, 46.2, 46.4; 360/85, 95, 96.3, 96.4

[56] References Cited

U.S. PATENT DOCUMENTS

| | | | |
|---|---|---|---|
| 2,659,542 | 11/1953 | Steuber | 242/68.3 |
| 3,014,672 | 12/1961 | Gerber | 242/68.3 |
| 3,565,360 | 2/1971 | Ura | 242/68.3 |
| 4,009,846 | 3/1977 | Coruzzi | 242/201 |
| 4,469,293 | 9/1984 | Miyazi et al. | 242/200 |
| 4,512,535 | 4/1985 | Dickson et al. | 242/201 X |
| 4,651,943 | 3/1987 | Kawaguchi | 242/68.3 |
| 4,754,939 | 7/1988 | Kaferbock et al. | 242/201 |
| 4,928,905 | 5/1990 | Granzotto et al. | 242/201 |

FOREIGN PATENT DOCUMENTS

| | | | |
|---|---|---|---|
| 1082091 | 5/1960 | Fed. Rep. of Germany | 242/201 |
| 1140792 | 12/1962 | Fed. Rep. of Germany | 242/68.3 |
| 52-55507 | 5/1977 | Japan | 242/201 |
| 5675287 | 11/1982 | Japan | 242/201 |
| 1188645 | 4/1970 | United Kingdom | 242/201 |

Primary Examiner—Daniel P. Stodola
Assistant Examiner—John P. Darling
Attorney, Agent, or Firm—Spensley Horn Jubas & Lubitz

[57] ABSTRACT

A self-locking hub for a computer tape drive that uses tape tension along to actuate a tape reel torque lock. In a preferred embodiment of the invention, the torque provided by tape tension after tape is threaded from a supply reel to a take-up reel provides sufficient force to actuate an over-center, spring-tensioned engagement pawl-like hub lock mechanism that engages an inner surface of a tape reel with sufficient force to secure the reel to the hub. More than one such self-locking mechanism may be provided for a single hub to provide additional locking force. In an alternative embodiment, the self-locking engagement pawl can include an engagement flange that prevents a tape reel from being pulled off the hub or from falling off a vertically-oriented hub, thus providing additional security. In yet another embodiment of the invention, the hub lock mechanism comprises a deformable torque clutch that deforms to an expanded diameter upon application of torque in one direction, and returns to a smaller at-rest diameter upon release of such applied torque.

14 Claims, 3 Drawing Sheets

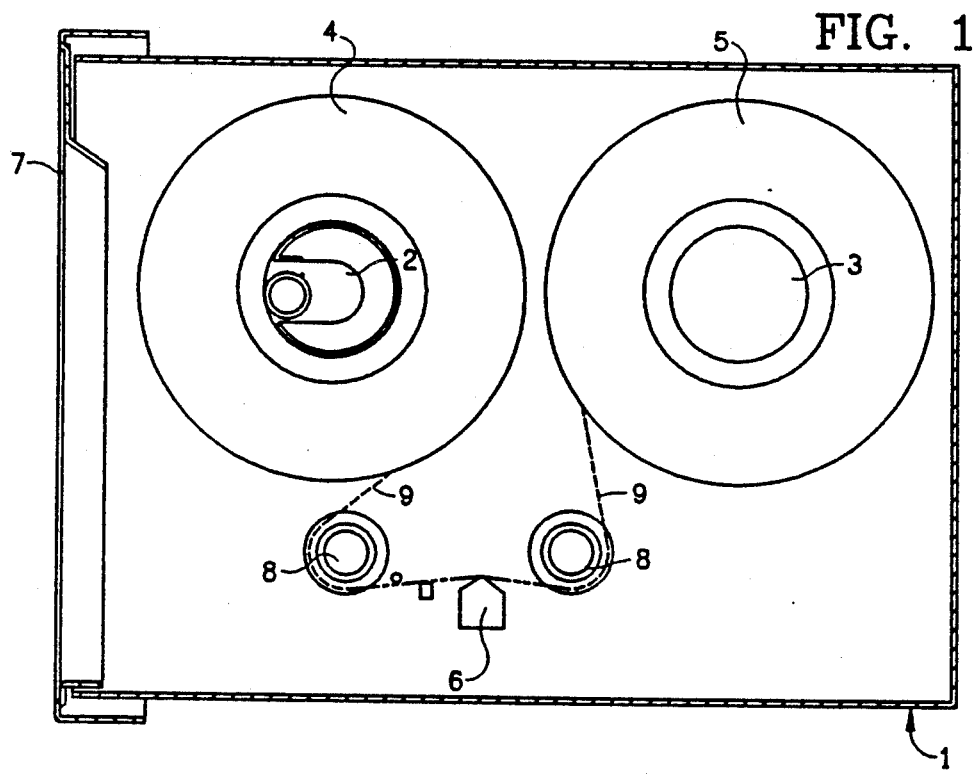
FIG. 1
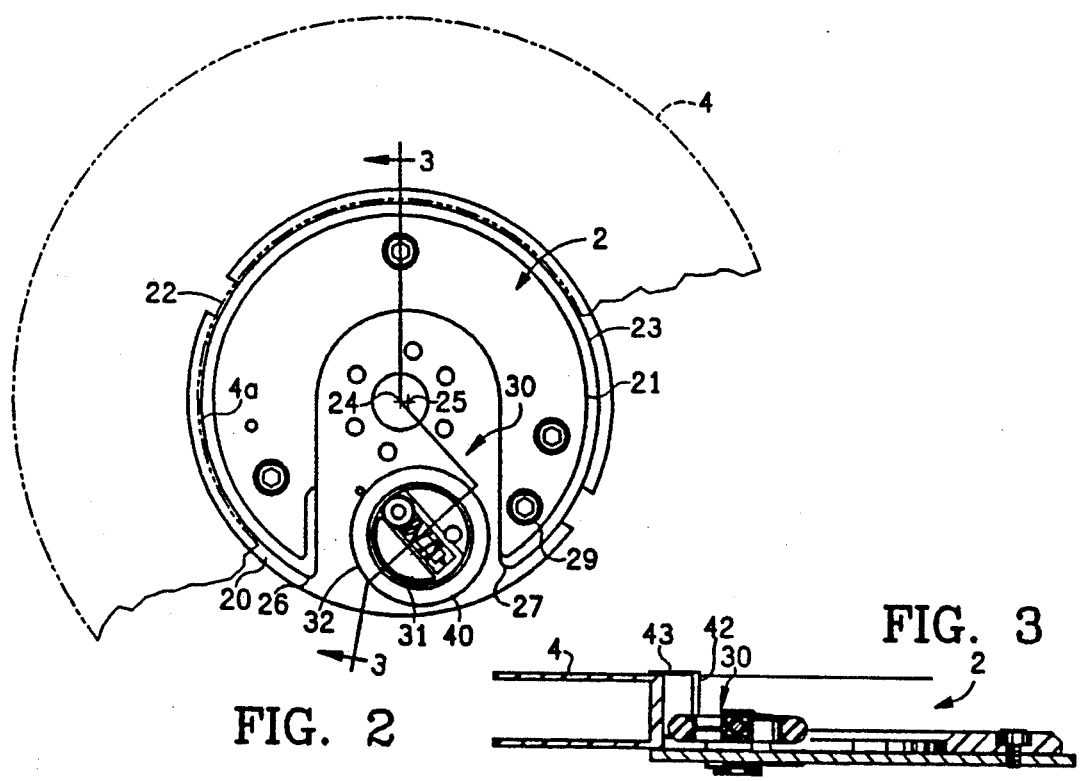
FIG. 2
FIG. 3

SELF-LOCKING TAPE DRIVE HUB

BACKGROUND OF THE INVENTION

1. Field of the Invention

This invention relates to computer peripherals, and more particularly to a self-locking hub for a computer tape drive.

2. Related Art

Magnetic tape drives have long been used for storage and retrieval of information, particularly in connection with high speed digital computers. A tape supply reel is normally secured on a supply hub and the free end of the tape is threaded along a predetermined path past a read/write head assembly. The tape end is then secured to a take-up reel mounted on a take-up hub. The supply and take-up hubs have individual drive motors. In response to various commands sent to the magnetic tape drive, the reels are simultaneously rotated clockwise or counter-clockwise so that various blocks of data on the tape may be read or written by the head assembly. However, the drive motor of the reel from which tape is unwinding at any one time is operated to provide torque in the appropriate direction to maintain approximately constant tension on the tape. Thus, the drive motor may provide torque in either direction with respect to the direction of tape motion. Such torque helps to maintain the tension of the tape across the read/write head assembly, and to prevent tape spillage upon a reversal of direction.

Standardized 9-track tape reels are designed for a friction drive hub. In order to prevent slippage of a tape reel around a drive hub, and to prevent a tape reel from falling off of a drive hub, each reel must be clamped to its respective hub so that a positive drive is established for precisely controlling the rotation of the reels during the normal read-write operation of the tape drive. In the past, this has been accomplished by manually securing reels to tape hubs by means of mechanical clamping mechanisms.

In recent years, the advent of horizontal-mount open reel tape drives has permitted a design in which the hubs are not directly exposed. A user inserts a tape into a slot, and a mechanism centers the inserted tape reel on a drive hub, automatically clamps the tape drive to the drive hub, and automatically threads the tape past the read/write head assembly and attaches the tape to the take-up reel. Two such designs are shown in U.S. Pat. Nos. 4,236,682 and 4,243,186.

It would be desirable to automatically secure or lock a tape reel to a drive hub without manual intervention. In the past, automatic hub locking mechanisms have typically relied upon one of two approaches: (1) use of a separate motor or actuator to directly clamp a reel to a hub, by means, for example, of an expansion ring, or (2) use of a solenoidtype mechanism to hold a hub in place and permit the torque of the drive hub motor to actuate a locking mechanism. An example of one such mechanism in the first category is shown in U.S. Pat. No. 4,236,682. An example of one such mechanism in the second category is shown in U.S. Pat. No. 4,243,186.

A problem of such automatic reel locking devices is that they are very complex, requiring not only electromechanically sophisticated apparatus, but also special sensing and/or control mechanisms to properly engage the locking apparatus at the appropriate time.

Therefore, it would be desirable to provide a self-locking tape drive hub mechanism that is mechanically simple, requires no special actuators or control systems, is inexpensive to manufacture, and provides automatic self-locking of a tape reel to a drive hub.

The present invention accomplishes these goals.

SUMMARY OF THE INVENTION

The invention comprises a self-locking tape drive hub that uses tape tension alone to actuate a tape reel torque lock. In a preferred embodiment of the invention, the torque provided by tape tension after tape is threaded from a supply reel to a take-up reel provides sufficient force to actuate an over-center, spring-tensioned engagement pawllike hub lock mechanism that engages an inner surface of a tape reel with sufficient force to secure the reel to the hub. More than one such self-locking mechanism may be provided for a single hub to provide additional locking force. In an alternative embodiment, the inventive self-locking engagement pawl can include an engagement flange that prevents a tape reel from being pulled off the hub or from falling off a vertically-oriented hub, thus providing additional security.

In yet another embodiment of the invention, the hub lock mechanism comprises a deformable torque clutch that deforms to an expanded diameter upon application of torque in one direction, and returns to a smaller at-rest diameter upon release of such applied torque.

The details of the preferred embodiment of the present invention are set forth below. Once the details of the invention are known, numerous additional innovations and changes will become obvious to one skilled in the art.

BRIEF DESCRIPTION OF THE DRAWINGS

FIG. 1 shows a top plan view of an open reel tape deck incorporating the inventive self-locking tape drive hub.

FIG. 2 is an enlarged top plan view of the self-locking tape drive hub of the present invention, with the locking mechanism in a disengaged position.

FIG. 3 is a cross-sectional view of the drive hub shown in FIG. 2, taken along line 3—3.

Like numbers and designations in the drawings refer to like elements.

DETAILED DESCRIPTION OF THE INVENTION

Figure 4:
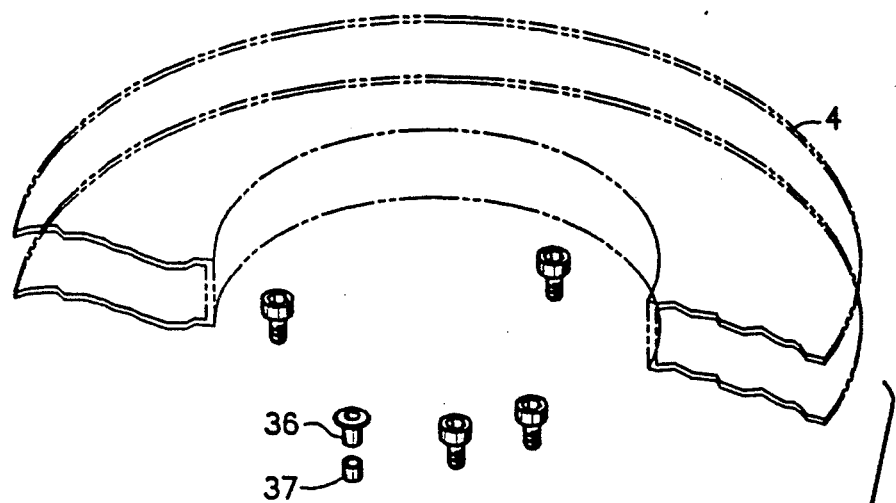
FIG. 4 is an exploded perspective view of the drive hub structure shown in FIG. 2.
Figure 4:
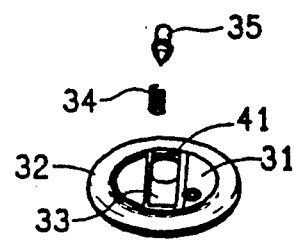
Figure 4:
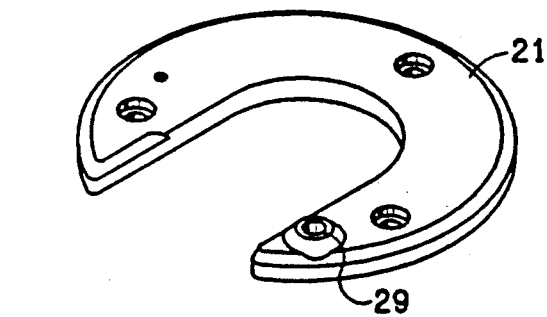
Figure 4:
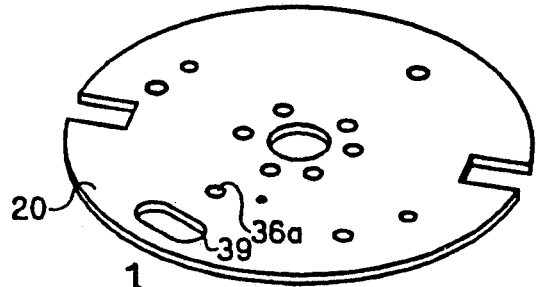

Throughout this description, the preferred embodiment and examples shown should be considered as exemplars, rather than limitations on the method of the present invention.

Prior art open-reel tape drive transports typically use high acceleration bidirectional motors to drive the tape drive hubs. The motors in effect "push" tape off of one reel at a rapid rate for take-up by the other reel. Positive motive force was necessary in the prior art because tape tension alone was insufficient to pull magnetic tape off of a reel at the desired rate without breaking the tape. A force of approximately 300 oz-in. would typically be required to provide the rate of tape movement necessary.

Such high acceleration rates were required under the prior art in order to quickly reverse the direction of tape motion without undue delays in reading or writing data while the tape attained the proper operational speed (e.g., 25 to 200 inches per second or higher). However, with modern electronic buffering of data read from and written to a tape, lower torque motors can be used to reverse the direction of the drive hubs of a tape drive system. Data can be stored in memory buffers until the tape has attained the proper operational speed, thus compensating for the longer time to speed caused by slower acceleration of the drive hubs. Typical modern tape drive systems operate at about 60 oz-in. of torque.

The inventors have recognized that the lower force required to accelerate tape reels in modern tape drives permits using tape tension alone to pull magnetic tape off of a reel. The inventors have made use of this fact by providing a torque-actuated self-locking tape drive hub that uses tape tension alone for actuation.

FIG. 1 shows a top view of an open reel tape deck incorporating the inventive self-locking tape drive hub. The tape deck 1 includes a supply hub 2 and a take-up hub 3. A removable reel of tape 4 may be placed on the supply hub 2 through a tape access door 7. Either an empty tape reel 5 may be placed on the take-up hub 3, or the tape deck may be configured with an integral take-up reel/hub structure, such as may be the case with horizontally mounted, front-loading open reel tape decks (such an integral reel/hub structure could of course be permanently locked to the tape deck 1). A read/write tape head assembly 6 is situated around idler wheels 8 such that tape 9 passing from the supply reel 4 to the take-up reel 5 will pass by the head assembly 6.

In addition, self-threading mechanisms may be provided. Examples of such mechanisms are set forth in the aforementioned U.S. patents.

FIG. 2 is an enlarged top plan view of the self-locking tape drive hub of the present invention. FIG. 3 is a cross-sectional view of the hub shown in FIG. 2, taken along line 3—3. FIG. 4 is an exploded perspective view of the hub structure shown in FIG. 2.

Referring to both FIGS. 2 and 3, the supply hub 2 comprises a base plate 20, which attaches to a drive motor within the tape deck 1. Attached to the base plate 20 is a "U"-shaped retainer boss 21 sized to fit the opening of a standard tape supply reel 4. The retainer boss 21 serves to prevent a tape reel 4 from shifting off of the base plate 20 after the reel 4 has been properly positioned on a supply hub 2. In the preferred embodiment, the retainer boss 21 has a raised tapered projection 29 (best seen in FIG. 4) that serves to automatically center a reel 4 on a supply hub 2. The projection 29 operates to engage the inner wall 4a of the reel 4 in the manner described in U.S. Pat. No. 4,243,186 (col. 8, describing lobe 108).

Situated within the open portion of the retainer boss 21 is one embodiment of the self-locking mechanism 30 of the present invention. The self-locking mechanism 30 comprises a central disk 31, preferably formed of molded plastic. Surrounding the rim of the central disk 31 is an elastomeric O-ring 32. The O-ring 32 is preferably made of an elastomeric material that has a relatively high coefficient of friction, sufficient to securely engage the inner wall 4a of a tape reel 4. A suitable material is gum-milled urethane.

Figure 5:
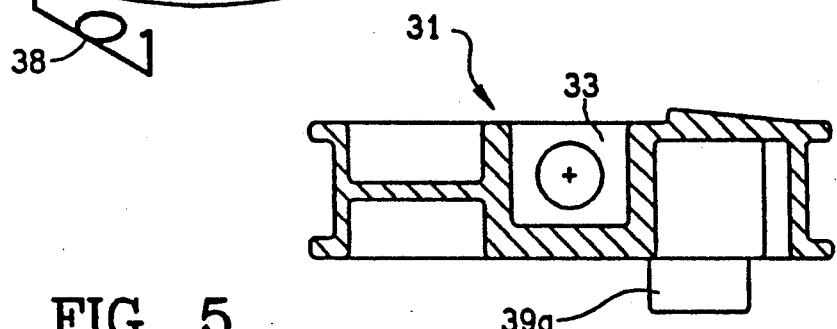
FIG. 5 is an enlarged cross-sectional view of the locking mechanism disk shown in FIG. 2, taken along line 3—3.

A central slot 33 within the central disk 31 (see FIG. 5) contains a compression spring 34 mounted around a spring post 35. The central disk 31 is pivotally affixed to the base plate 20 by a retaining post 36, which is secured through a hole 36a from beneath the base plate 20 by a fastener (not shown). Surrounding the retaining post 36 is a bushing 37 which provides a bearing surface for one end of the spring 34, to prevent undue wear on the retaining post 36.

Figure 6:
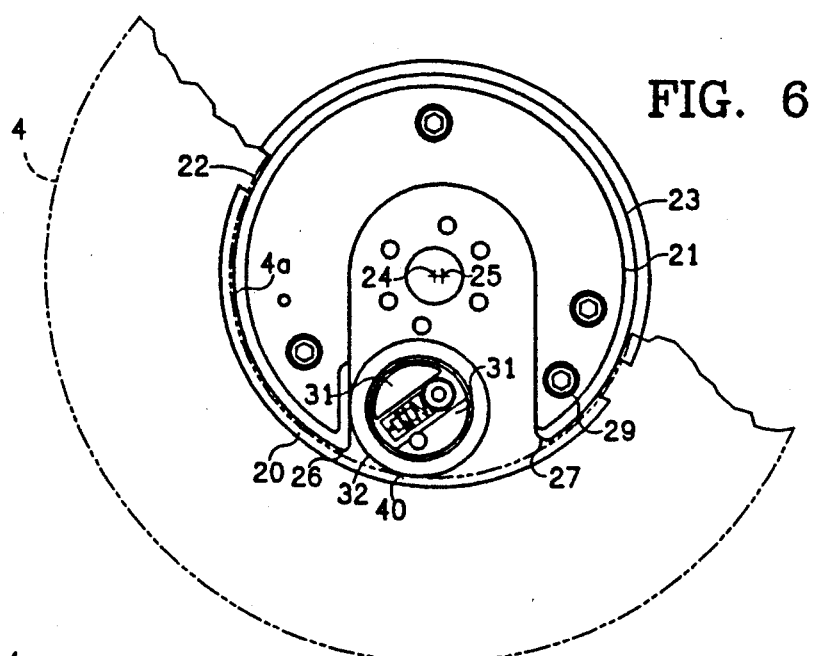
FIG. 6 is an enlarged top plan view of the self-locking tape drive hub of the present invention, with the locking mechanism in an engaged position.

As noted, the self-locking mechanism 30 pivots around the retaining post 36. The initial position of the self-locking mechanism 30 is eccentric with respect to the radius of the hub, as shown in FIG. 2. The self-locking mechanism 30 can be pivoted to an over-center position, as shown in FIG. 6, which increases the effective diameter of the hub.

A return spring 38 situated beneath the base plate 20 and projecting in part through an oval opening 39 in the base plate 20 provides a biasing force to return the self-locking mechanism 30 to its initial position shown in FIG. 2 in the absence of an opposing torque applied to the self-locking mechanism 30. Other means may be used to accomplish the same function as the return spring, such as an elastomeric tension band.

A stop boss 39a (see FIG. 5) formed on the bottom of the central disk 31 fits within the oval opening 39, and serves to limit the range of rotation of the self-locking mechanism.

The spring post 35 is preferably fixed to one end of the central slot 33 by, for example, a friction fit. The spring post 35 retains the internal compression spring 34 in a position perpendicular to the retaining post 36 and bushing 37. The spring 34 of the self-locking mechanism 30 is provided to permit greater accommodation of variations in tape reel inner diameter. An oval opening 41 in the central disk 31 permits the central disk 31 to be displaced towards the pivot post 36 as the spring 34 is compressed by forces directed at least in part towards the pivot post 36. Thus, a tape reel having a smaller inner diameter will compress the compression spring 34 a greater amount than a tape reel having a somewhat larger inner diameter. The spring 34 thus helps to maintain an approximately constant outward radial force by the central disk 31 against the inner wall 4a of the tape reel 4 despite differences in tape reel diameters. However, if tape reels having a relatively uniform inner diameter are used in conjunction with the invention, the compression spring 34 is not necessary.

Optionally, variations in inner reel diameter can be accommodated by selecting a suitable elastomeric material for the O-ring 32. In an alternative embodiment of the invention, the self-locking mechanism 30 could be made out of a solid disk of rubber or similar material, with the elastomeric characteristics of the material substituting for the spring 34 of the preferred embodiment. However, in general, the spring rate of the compression spring 34 can be more easily selected to accommodate diameter differences, and hence the compression spring 34 is preferred.

Referring to FIG. 2, it should be noted that the retainer boss 21 is slightly asymmetric, in that the outer edge 22 of one side comprises a circular arc centered at a first center point 24, while a second edge 23 is centered about a second center point 25. Thus, the distance between the edge of the base plate 20 and the tip 26 of the larger diameter edge 22 is less than the distance between the edge of the base plate 20 and the tip 27 of the smaller diameter portion of the retainer boss 21. The result of this asymmetry is that a contact point 40 on the self-locking mechanism 30 projects slightly beyond the tip 27 of the smaller diameter portion of the retainer boss 21, and thus is exposed to greater initial contact with the inside wall 4a of a tape reel 4.

In operation, a tape reel 4 is placed over the inventive hub. The inner wall 4a of the reel 4 will thus contact the contact point 40 of the self-locking mechanism 30. Tape from the reel 4 is threaded through the tape drive 1 in normal fashion to a take-up reel 5. As tape tension between the supply hub 2 and the take-up hub 3 increases, the supply hub 2 begins to freely rotate inside the supply reel 4. Referring to FIG. 2, frictional contact between the inner wall 4a of the reel 4 and the contact point 40 will cause the self-locking mechanism 30 to pivot about the retaining post 36 as the supply hub 2 rotates counter-clockwise. As the self-locking mechanism 30 pivots in a clockwise direction, the effective diameter of the hub increases, thereby increasing the outward radial force applied by the self-locking mechanism 30 against the inner wall 4a of the reel 4. The self-locking mechanism 30 will reach a point where the spring post 35 is aligned along a radius of the hub. Further counterclockwise motion of the supply hub 2 will force the self-locking mechanism 30 to its over-center position slightly beyond that radius, as shown in FIG. 6. The self-locking mechanism 30 is prevented from further rotation by contact of the stop boss 39a with the edge of the oval opening 39. The reel 4 is thus securely held to the hub base plate 20 by the radial force applied to the inner wall 4a of the reel 4 by the increased effective diameter of the self-locking mechanism 30 in its over-center position.

The over-center position of the self-locking mechanism 30 requires that some force be applied counterclockwise to the self-locking mechanism 30 before it returns to its initial position. The compression spring 34 (or its equivalent) must be compressed in order to move the self-locking mechanism 30 from its engagement position to its initial position. Thus, slight decreases in tape tension will not lessen the locking force of the self-locking mechanism 30.

In the preferred embodiment of the invention, the self-locking mechanism 30 is actuated at approximately 40 oz.-inches of torque, and securely retains a reel 4 of tape up to about 100 oz.-inches of torque (thereafter, the smooth plastic of the inner wall 4a of the reel 4 tends to slide on the contact point 40 of the self-locking mechanism 30). If desired, multiple self-locking mechanisms 30 can be used to increase the locking force, with no increase in the actuation force. That is, if three self-locking mechanisms 30 of the type shown in FIG. 2 were used, all three would be actuated upon the application of approximately 40 oz.-inches of torque, yet the radial holding force would approximately triple.

Although a disk-shaped self-locking mechanism 30 is disclosed in the drawings, other shapes and structures may be used to accomplish the same function. For example, since the contact point 40 of the self-locking mechanism 30 is fairly small in area, a wedge-shaped sector of a disk could be used in place of the disk structure disclosed in the drawings. Alternatively, the self-locking mechanism 30 may be oblong, mushroom-shaped, triangular, or of any other shape that is suitable for providing an over-center, pawl-like engagement with the inner wall 4a of a tape reel 4.

In an alternative embodiment of the invention, an upward projection 42 having an engagement lip or flange 43 can be attached to the central disk 31 such that the projection 42 extends upward to approximately the thickness of a tape reel 4 (see FIG. 3). As the self-locking mechanism 30 pivots into locking engagement, the engagement flange 43 extends over the outer surface of the reel and helps prevent disengagement of the reel 4 from the hub by outward displacement parallel to the axis of the hub. The engagement flange 43 is especially useful for securing reels to tape drives configured with vertically mounted hubs.

Figure 7:
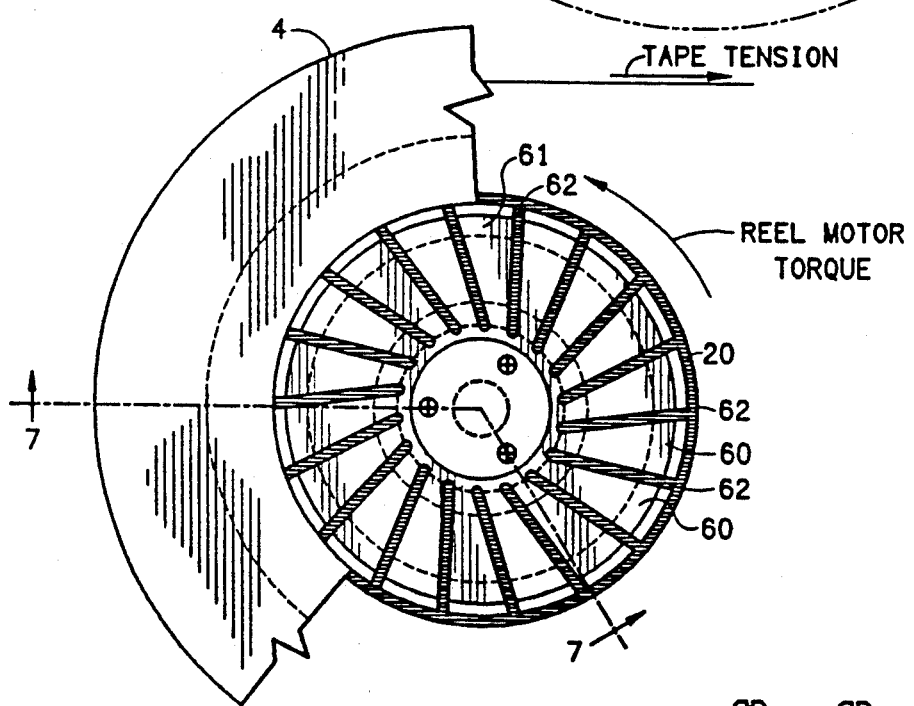
FIG. 7 is a top plan view of another embodiment of the inventive self-locking tape drive hub.

FIG. 7 shows yet another embodiment of the invention that is even simpler than the embodiment shown in FIG. 3. Mounted on a base plate 20 is a deformable torque-actuated clutch wheel 60 made, for example, of cast or milled elastomeric material, such as gum-milled urethane. The clutch wheel 60 includes a number of spokes 61 that are separated by interspoke gaps 62 and which are flexible around their attachment points 63 to an inner hub 64 of the clutch wheel 60. The interspoke gaps 62 are not aligned along radii of the clutch wheel 60, but are instead set at an angle to such radii.

Each spoke 61 in effect operates in a manner similar to the self-locking mechanism 30 described above. If a reel 4 is placed over the clutch wheel 60 shown in FIG. 7 and rotated clockwise, the spokes 61 will frictionally engage the inner wall 4a of the reel 4. As the reel 4 attempts to slip around the clutch wheel 60, the spokes 61 will be flexed in a clockwise direction, thereby deforming to a radially expanded state, effectively increasing the diameter of the clutch wheel 60. That is, due to the shape of the spokes 61, pivoting the flexible spokes 61 clockwise around their attachment points 63 causes the radial length of the spokes 61 to increase. Each spoke 61 acts in a pawl-like manner to engage the inner wall 4a of the reel 4. The increased diameter of the clutch wheel 60 exerts an outward radial force against the inner wall 4a of the reel 4, thereby securing the reel 4 to the hub base plate 20.

Continued application of torque by the reel motor opposite the direction of the torque imposed by tension on the tape maintains the radially expanded state of the spokes 61. Application to the hub of counterclockwise torque will cause the spokes 61 to return to their at-rest positios, effectively reducing the diameter of the clutch wheel 60.

Figure 8:
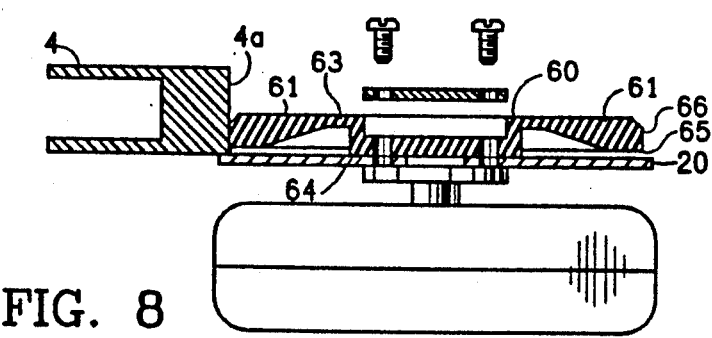
FIG. 8 is a cross-sectional view of the drive hub shown in FIG. 7, taken along line 7—7.

In a preferred embodiment of this version of the invention, the spokes 61 are separated by a short gap 65 from the base plate 20, as shown in FIG. 8. Each spoke is thinner at its attachment point 63 than at its radial end 66. As the clutch wheel 60 expands radially upon application of torque from a tape reel 4 under tension, a radially inward force is applied to the spokes 61 as the inner wall 4a of the tape reel 4 resists the outward force of the expansion. The spokes 61 tend to buckle slightly at the thinner attachment point 63, thereby causing the radial end 66 of each spoke 61 to be pushed in a downward direction into contact with the base plate 20, thereby seating the reel 4 more securely against the base plate 20.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

I claim:

1. A self-locking mechanism that used only tape tension to actuate a tape reel torque lock for a tape drive having at least one hub with a base plate, the self-locking mechanism for each such hub comprising:

a reel engagement means pivotally mounted on the hub base plate for engaging the inner wall of a tape reel, and being pivotable between a disengaged position having a first effective diameter and an engaged position having a second effective diameter greater than the first effective diameter, the reel engagement means being situated in its disengaged position so as to be proximate to the inner wall of a reel when the reel is mounted on the hub base plate, wherein the reel engagement means is contacted by the inner wall of a mounted reel and automatically pivots from its disengaged position to its engaged position by frictional contact between the reel engagement means and the inner wall of the reel when sufficient tension is applied to the tape of the tape reel, the reel engagement means in its engaged position applying a radial force against the inner wall of the tape reel to lock the reel to the hub base plate, wherein the reel engagement means includes a disk pivotally mounted on the hub wheel base plate, and wherein the disk includes a first spring coupled to the disk for maintaining approximately constant outward radial force by the disk against the inner wall of the tape reel.

2. The self-locking mechanism of claim 1, further including a second spring means coupled to the disk and the hub wheel base plate for returning the disk to the disengaged position from the engaged position upon disengagement of the reel from the base plate.

3. The self-locking mechanism of claim 1, further including a U-shaped retainer boss means attached to the base plate, having primary responsibility for preventing shifting of the tape reel off of the hub base plate.

4. The self-locking mechanism of claim 3, wherein the U-shaped retainer boss is asymmetric, having a first extension with a first radius and a second extension with a second radius less than the first radius, the disk being positioned within the opening of the U-shaped retainer boss such that a contact point of the disk projects beyond the tip of the second extension and is thereby exposed to contact with the inner wall of a tape reel mounted on the retainer boss.

5. The self-locking mechanism of claim 1, wherein the engaged position of the reel engagement means is an over-center position with respect to a radius of the hub base plate.

6. The self-locking mechanism of claim 1, further including an elastomeric ring mounted around the rim of the disk, for engaging the inner wall of a tape reel.

7. A self-locking mechanism that uses only tape tension to actuate a tape reel torque lock for a tape drive having at least one hub with a base plate, the self-locking mechansim for each such hub comprising:

a reel engagement means pivotally mounted on the hub base plate for engaging the inner wall of a tape reel, and being pivotable between a disengaged position having a first effective diameter and an engaged position having a second effective diameter greater than the first effective diameter, the reel engagement means being situated in its disengaged position so as to be proximate to the inner wall of a reel when the reel is mounted on the hub base plate, wherein the reel engagement means is contacted by the inner wall of a mounted reel and automatically pivots from its disengaged position to its engaged position by frictional contact between the reel engagement means and the inner wall of the reel when sufficient tension is applied to the tape of the tape reel, the reel engagement means in its engaged position applying a radial force against the inner wall of the tape reel to lock the reel to the hub base plate, and wherein the self-locking mechanism further including an engagement flange coupled to the reel engagement means and extending out from the hub base plate approximately the thickness of a tape reel, the engagement flange being situated such that, when the reel engagement means is in its engaged position, an edge of the engagement flange extends over part of the outer surface of the reel and prevents disengagement of the reel from the hub base plate by displacement parallel to the axis of the hub base plate.

8. A self-locking hub that uses only tape tension to actuate a tape reel torque lock for a tape drive, including:

a) a hub base plate;

b) a reel engagement means pivotally mounted on the hub base plate for engaging the inner wall of a tape reel, and being pivotable between a disengaged position having a first effective diameter and an engaged position having a second effective diameter greater than the first effective diameter, the reel engagement means being situated in its disengaged position so as to be proximate to the inner wall of a reel when the reel is mounted on the hub base plate;

wherein the reel engagement means is contacted by the inner wall of a mounted reel and automatically pivots from its disengaged position to its engaged position by frictional contact between the reel engagement means and the inner wall of the reel when sufficient tension is applied to the tape of the tape reel, the reel engagement means in its engaged position applying a radial force against the inner wall of the tape reel to lock the reel to the hub base plate, wherein the reel engagement means includes a disk pivotally mounted on the hub wheel base plate, and wherein the disk includes a first spring coupled to the disk and the hub wheel base plate for maintaining approximately constant outward radial force by the disk against the inner wall of the tape reel.

9. The self-locking mechanism of claim 8, further including a second spring means coupled to the disk and the hub wheel base plate for returning the disk to the disengaged position from the engaged position upon disengagement of the reel from the base plate.

10. The self-locking mechanism of claim 8, further including a U-shaped retainer boss means attached to the base plate, having primary responsibility for preventing shifting of the tape reel off of the hub base plate.

11. The self-locking mechanism of claim 10, wherein the U-shaped retainer boss is asymmetric, having a first extension with a first radius and a second extension with a second radius less than the first radius, the disk being positioned within the opening of the U-shaped retainer boss such that a contact point of the disk projects beyond the tip of the second extension and is thereby exposed to contact with the inner wall of a tape reel mounted on the retainer boss.

12. The self-locking mechanism of claim 8, wherein the engaged position of the reel engagement means is an over-center position with respect to a radius of the hub base plate.

13. The self-locking mechanism of claim 8, further including an elastomeric ring mounted around the rim of the disk, for engaging the inner wall of a tape reel.

14. A self-locking hub that uses only tape tension to actuate a tape reel torque lock for a tape drive, including:
   a) a hub base plate;
   b) a reel engagement means pivotally mounted on the hub base plate for engaging the inner wall of a tape reel, and being pivotable between a disengaged position having a first effective diameter and an engaged position having a second effective diameter greater than the first effective diameter, the reel engagement means being situated in its disengaged position so as to be proximate to the inner wall of a reel when the reel is mounted on the hub base plate;

wherein the reel engagement means is contacted by the inner wall of a reel and automatically pivots from its disengaged position to its engaged position by frictional contact between the reel engagement means and the inner wall of the reel when sufficient tension is applied to the tape of the tape reel, the reel engagement means in its engaged position applying a radial force against the inner wall of the tape reel to lock the reel to the hub base plate, the self-locking mechanism further including an engagement flange coupled to the reel engagement means and extending out from the hub base plate approximately the thickness of a tape reel, the engagement flange being situated such that, when the reel engagement means is in its engaged position, an edge of the engagement flange extends over part of the outer surface of the reel and prevents disengagement of the reel from the hub base plate by displacement parallel to the axis of the hub base plate.

* * * * *